US011326873B2

(12) United States Patent
Milch et al.

(10) Patent No.: US 11,326,873 B2
(45) Date of Patent: May 10, 2022

(54) 3-D INTRAORAL SURFACE CHARACTERIZATION

(71) Applicant: Carestream Dental Technology Topco Limited, London (GB)

(72) Inventors: James R. Milch, Penfield, NY (US); Victor C. Wong, Pittsford, NY (US)

(*) Notice: Subject to any disclaimer, the term of this patent is extended or adjusted under 35 U.S.C. 154(b) by 0 days.

(21) Appl. No.: 16/984,353

(22) Filed: Aug. 4, 2020

(65) Prior Publication Data
US 2020/0363194 A1 Nov. 19, 2020

Related U.S. Application Data

(63) Continuation of application No. 16/462,782, filed as application No. PCT/US2016/063037 on Nov. 21, 2016, now Pat. No. 10,731,974.

(51) Int. Cl.
| | |
|---|---|
| G01B 11/25 | (2006.01) |
| G06T 7/64 | (2017.01) |
| G06T 7/521 | (2017.01) |
| A61C 9/00 | (2006.01) |

(52) U.S. Cl.
CPC .......... *G01B 11/2513* (2013.01); *A61C 9/006* (2013.01); *G06T 7/521* (2017.01); *G06T 7/64* (2017.01); *G06T 2207/10152* (2013.01); *G06T 2207/30036* (2013.01)

(58) Field of Classification Search
CPC .. G06T 7/521; G06T 7/55; G06T 7/64; G06T 2207/30036; G06T 2207/10152; G01B 11/2527; G01B 11/2513; A61C 9/006
See application file for complete search history.

(56) References Cited

U.S. PATENT DOCUMENTS

| | | | | |
|---|---|---|---|---|
| 2009/0238449 | A1* | 9/2009 | Zhang | G06T 7/521 382/165 |
| 2010/0074532 | A1* | 3/2010 | Gordon | G06T 7/536 382/203 |
| 2011/0081072 | A1* | 4/2011 | Kawasaki | G06T 7/521 382/154 |
| 2013/0010080 | A1* | 1/2013 | Ray | G01S 17/00 348/47 |
| 2013/0120532 | A1* | 5/2013 | Milch | A61C 9/006 348/45 |
| 2015/0145959 | A1* | 5/2015 | Tang | H04N 13/254 348/46 |

* cited by examiner

*Primary Examiner* — Neil R Mikeska

(57) ABSTRACT

A method for registering an imaging detector to a surface projects and records a sequence having a first sparse pattern of lines followed by a second sparse pattern of lines. A first subset of positions receives lines from both first and second sparse patterns corresponding to a first label. A second subset of positions receives only lines from the first sparse pattern corresponding to a second label. A third subset of positions receives only lines from the second sparse pattern corresponding to a third label. The first, second, and third labels are decoded and each member element of the first, second, and third subsets of positions registered to the imaging detector according to the decoded labels. One or more dense patterns of lines positionally correlated with registered member elements of the decoded labels are projected and recorded. An image of the surface contour is formed according to the recorded pattern.

20 Claims, 9 Drawing Sheets

*F1*

*F2*

*E*

*E'*

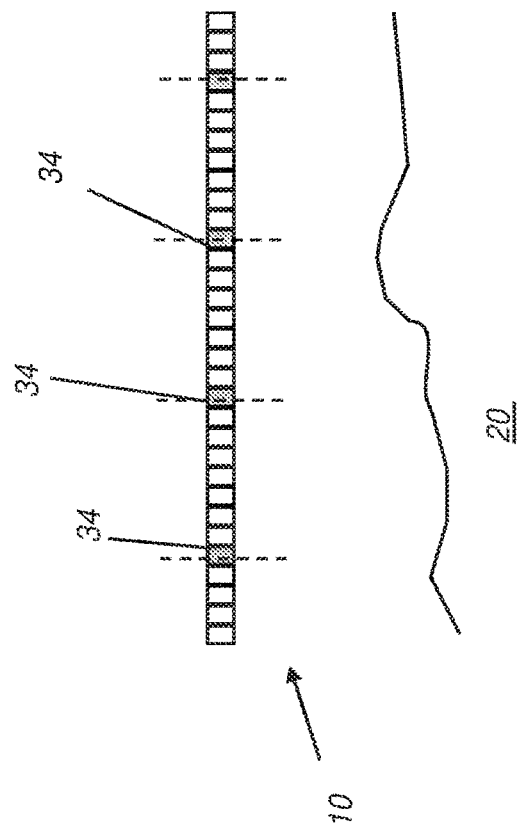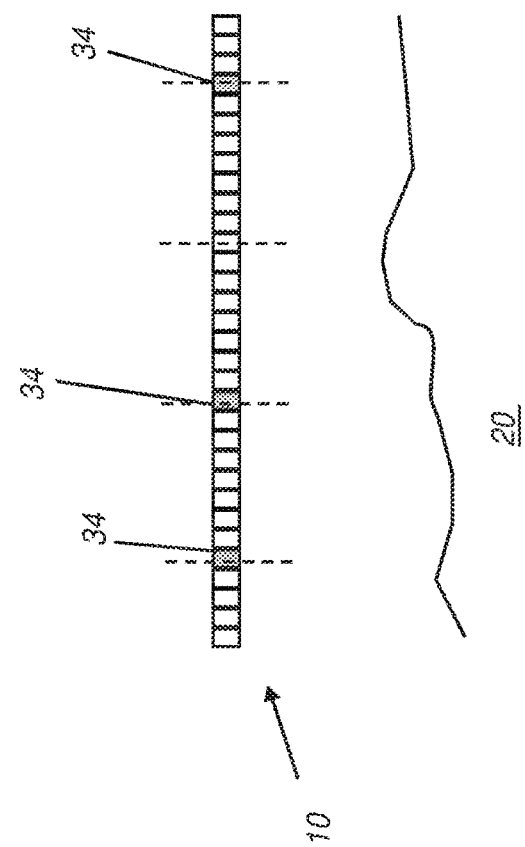

3-D INTRAORAL SURFACE CHARACTERIZATION

TECHNICAL FIELD

The invention relates generally to the field of surface shape characterization and more particularly relates to intraoral surface imaging and measurement using patterned illumination.

BACKGROUND

The ability to determine the 3D structure of small objects is of value in a variety of applications, including intra-oral or dental imaging. Intra-oral imaging presents a number of challenges for detecting 3-D structure, such as those relating to difficulty in access and positioning, optical characteristics of teeth and other features within the mouth, and the need for precision measurement of irregular surfaces.

A number of techniques have been developed for obtaining surface contour information from various types of objects in medical, industrial, and other applications. Optical 3-dimensional (3-D) measurement methods provide shape and depth information using images obtained from patterns of light directed onto a surface. Various types of imaging methods generate a series of light patterns and use focus or triangulation to detect changes in surface shape over the illuminated area.

Surface contour imaging uses patterned or structured light and triangulation to obtain surface contour information for structures of various types. In contour imaging, a pattern of lines or other features is projected toward the surface of an object from a given angle. The projected pattern from the surface is then viewed from another angle as a contour image, taking advantage of triangulation in order to analyze surface information based on the appearance of contour lines. Phase shifting, in which the projected pattern is incrementally spatially shifted for obtaining additional measurements at offset locations, is typically applied as part of surface contour imaging, used in order to complete the contour mapping of the surface and to increase overall resolution in the contour image.

Surface contour imaging using structured light has been used effectively for solid, highly opaque objects and has been used for characterizing the surface shape for some portions of the human body and for obtaining detailed data about skin structure. However, a number of technical obstacles have prevented effective use of contour projection imaging of the tooth. One particular challenge with dental surface imaging relates to tooth translucency. Translucent or semi-translucent materials in general are known to be particularly troublesome for patterned light imaging. Subsurface scattering in translucent structures can reduce the overall signal-to-noise (S/N) ratio and shift the light intensity, causing inaccurate height data. Another problem relates to high levels of reflection for various tooth surfaces. Highly reflective materials, particularly hollowed reflective structures, can effectively reduce the dynamic range of this type of imaging.

From an optical perspective, the structure of the tooth itself presents a number of additional challenges for structured light projection imaging. Teeth can be wet or dry at different times and along different surfaces and portions of surfaces. Tooth shape is often irregular, with sharp edges. As noted earlier, teeth interact with light in a complex manner. Light penetrating beneath the surface of the tooth tends to undergo significant scattering within the translucent tooth material. Moreover, reflection from opaque features beneath the tooth surface can also occur, adding noise that degrades the sensed signal and thus further complicates the task of tooth surface analysis. Not all light wavelengths can be detected with equal accuracy. Thus, a multi-spectral or multicolor approach can be less satisfactory in some cases.

One corrective measure that has been attempted is application of a coating that changes the reflective characteristics of the tooth surface itself. To compensate for problems caused by the relative translucence of the tooth, a number of conventional tooth contour imaging systems apply a paint or reflective powder to the tooth surface prior to surface contour imaging. This added step enhances the opacity of the tooth and eliminates or reduces the scattered light effects noted earlier. However, there are drawbacks to this type of approach. The step of applying a coating powder or liquid adds cost and time to the tooth contour imaging process. Because the thickness of the coating layer is often non-uniform over the entire tooth surface, measurement errors readily result. More importantly, the applied coating, while it facilitates contour imaging, can tend to mask other problems with the tooth and can thus reduce the overall amount of useful information that can be obtained.

Even where a coating or other type of surface conditioning of the tooth is used, however, results can be disappointing due to the pronounced contours of the tooth surface and inherent difficulties such as angular and space limitations. It can be difficult to provide sufficient amounts of light onto, and sense light reflected back from, all of the tooth surfaces. For example, different surfaces of the same tooth can be oriented at 90 degrees relative to each other, making it difficult to direct enough light for accurately imaging all parts of the tooth.

A number of problems complicate mapping of an illumination array to sensor circuitry for accurate surface contour measurement. Because multiple images must be captured with the teeth in the same position, any type of movement of the camera or of the patient can complicate the measurement task or require re-imaging and additional measurement and computation time. Thus, it is advantageous to reduce the number of images and amount of time needed for accurate mapping. At the same time, however, measurement improves when multiple images can be obtained and their respective data correlated. Given these conflicting considerations, it can be seen that there are advantages to more efficient pixel mapping techniques that obtain a significant amount of surface contour data from a small number of images.

SUMMARY

An object of the present disclosure is to advance the art of surface contour characterization of teeth and related intraoral structures. Exemplary embodiments of the present disclosure provide 3-D surface information about a tooth by illuminating the tooth surface with an arrangement of light patterns that help to more closely map pixel locations on a digital imaging array with pixel locations from an illumination device. Advantageously, exemplary embodiments can be used with known illumination and imaging component arrangements and is adapted to help reduce ambiguity of sensed patterns when compared against conventional contour detection methods. As a further advantage, exemplary embodiments of the present disclosure require fewer frames of illumination than other methods, alleviating the problems caused by patient or operator motion.

These objects are given only by way of illustrative example, and such objects may be exemplary of one or more embodiments of the disclosure. Other desirable objectives and advantages inherently achieved by the disclosed method may occur or become apparent to those skilled in the art. The invention is defined by the appended claims.

According to one aspect of the disclosure, there is provided a method for registering an imaging detector to a surface, the method executed at least in part on a computer and can include projecting and recording, on a portion of the surface, a sequence comprising a first sparse pattern of lines followed by a second sparse pattern of lines, wherein a first subset of positions on the surface is illuminated by lines from both first and second sparse patterns corresponding to a first label, a second subset of positions on the surface is illuminated only by lines from the first sparse pattern corresponding to a second label; and a third subset of positions on the surface is illuminated only by lines from the second sparse pattern corresponding to a third label; decoding the first, second, and third labels from the surface positions and registering each member element of the first, second, and third subsets of positions to the imaging detector according to the decoded labels; projecting and recording one or more dense patterns of lines that are positionally correlated with registered member elements of the decoded labels; and forming and displaying an image of the surface contour according to the recorded patterns.

BRIEF DESCRIPTION OF THE DRAWINGS

The foregoing and other objects, features, and advantages of the disclosure will be apparent from the following more particular description of the embodiments of the disclosure, as illustrated in the accompanying drawings. The elements of the drawings are not necessarily to scale relative to each other.

FIG. 8A shows schematically a portion of a single line of illumination pixels from the illumination array, energized for forming a portion of a fully populated multiline image frame.

FIG. 8B shows schematically a portion of a single line of illumination pixels from the illumination array, energized for forming a portion of a sparse image frame.

DESCRIPTION OF EXEMPLARY EMBODIMENTS

Figure 1:
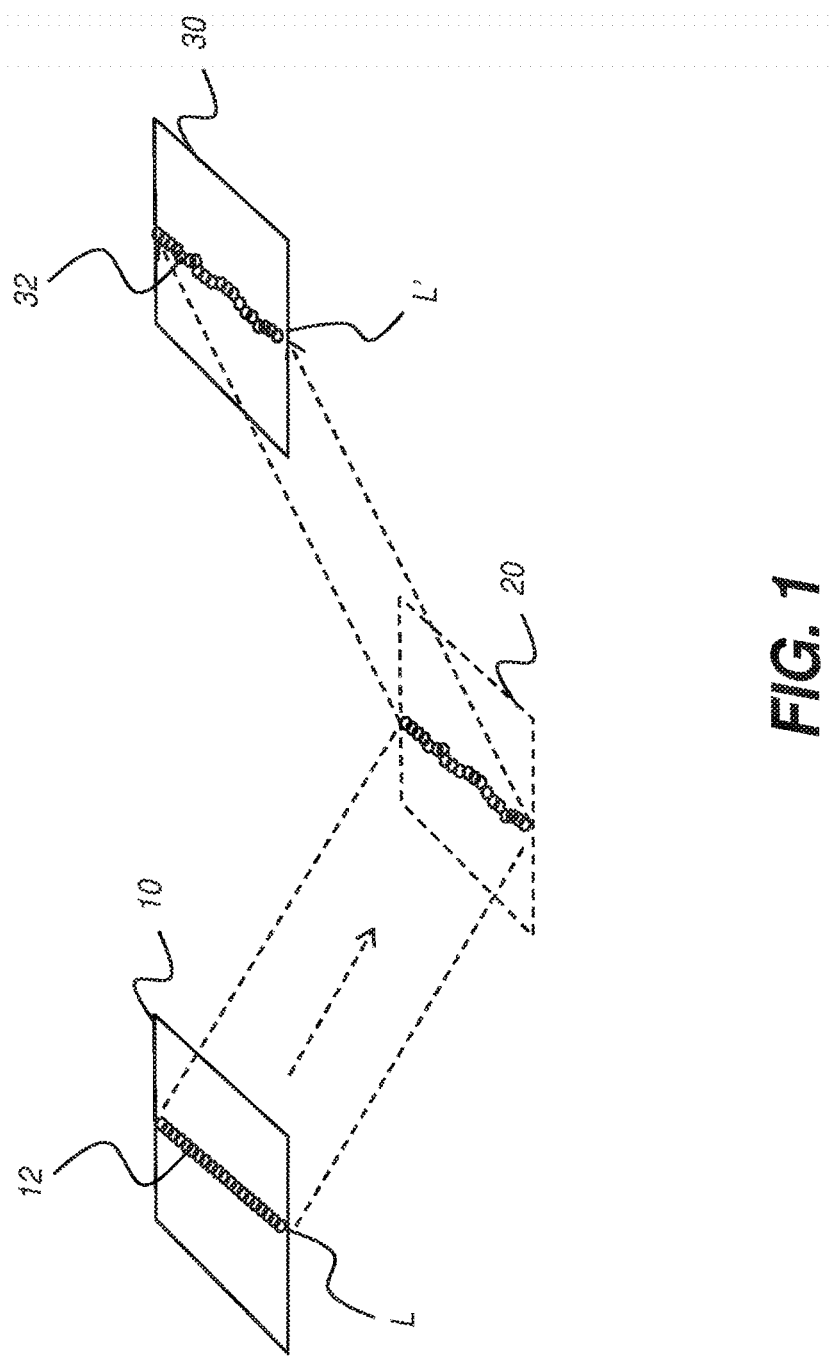
FIG. 1 is a schematic diagram that shows mapping a sensor pixel array to an illumination array according to a surface.

The following is a description of exemplary embodiments, reference being made to the drawings in which the same reference numerals identify the same elements of structure in each of the several figures.

Where they are used, the terms "first", "second", and so on, do not necessarily denote any ordinal, sequential, or priority relation, but may be used for more clearly distinguishing one element, set of elements, or time interval from another. The term "exemplary" indicates that the description is used as an example, rather than implying that it is an ideal.

In the context of the present disclosure, the terms "viewer", "operator", and "user" are considered to be equivalent and refer to the viewing practitioner or technician or other person who views and manipulates an image, such as a dental image, on a display monitor.

The term "set", as used herein, refers to a non-empty set, as the concept of a collection of elements or members of a set is widely understood in elementary mathematics. The term "subset", unless otherwise explicitly stated, is used herein to refer to a non-empty subset, that is, to a subset of the larger set, having one or more members. For a set S, a subset may comprise the complete set S, including all members. A "proper subset" of set S is strictly contained in set S and excludes at least one member of set S. In the context of the present disclosure, the term "subset" is used to mean a non-empty proper subset, unless otherwise specifically noted.

The schematic diagram of FIG. 1 shows, with the example of a single line of light L, how patterned light is used for obtaining surface contour information. A mapping is obtained as an illumination array 10 projects or directs a pattern of light onto a surface 20 and a corresponding image of a reflected line L' is formed on an imaging sensor array 30. Each pixel 32 on imaging sensor array 30 can map to a corresponding pixel 12 on illumination array 10 according to modulation by surface 20. Shifts in pixel position, as represented in FIG. 1, yield useful information about the contour of surface 20. It can be appreciated that the basic pattern shown in FIG. 1 can be implemented in a number of ways, using a variety of illumination sources including multiple identical or different illumination sources and sequences for projecting the images and using one or more different types of sensor arrays 30 for obtaining or acquiring image data. Illumination array 10 can utilize any of a number of types of arrays used for light modulation, such as a liquid crystal array or digital micromirror array, such as that provided using the Digital Light Processor or DLP device from Texas Instruments, Dallas, Tex. This type of spatial light modulator is used in the illumination path to change the projected light pattern as needed for the mapping sequence.

Figure 2B:
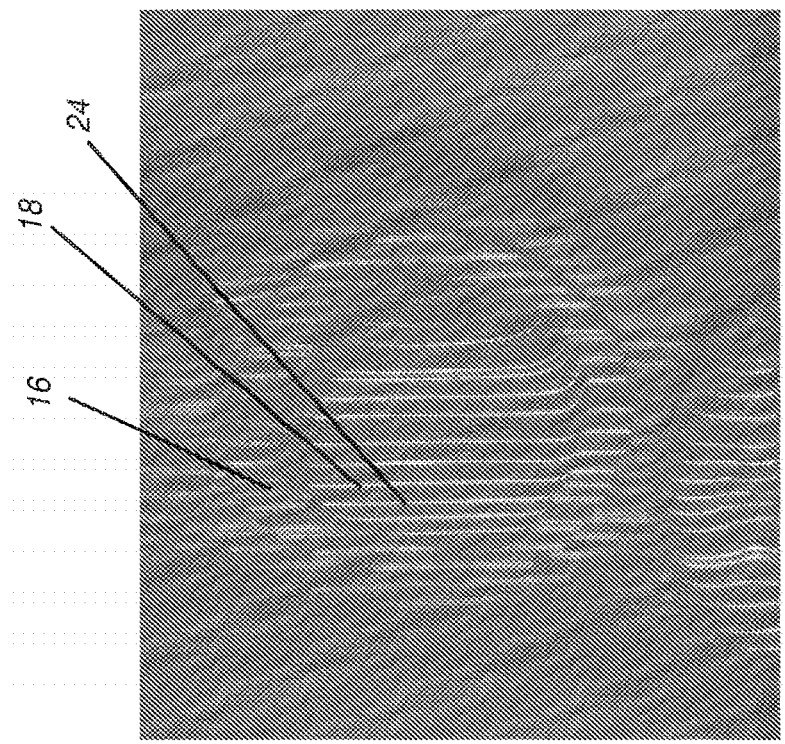
FIG. 2B shows illumination of a tooth surface with multiple lines of light.
Figure 2A:
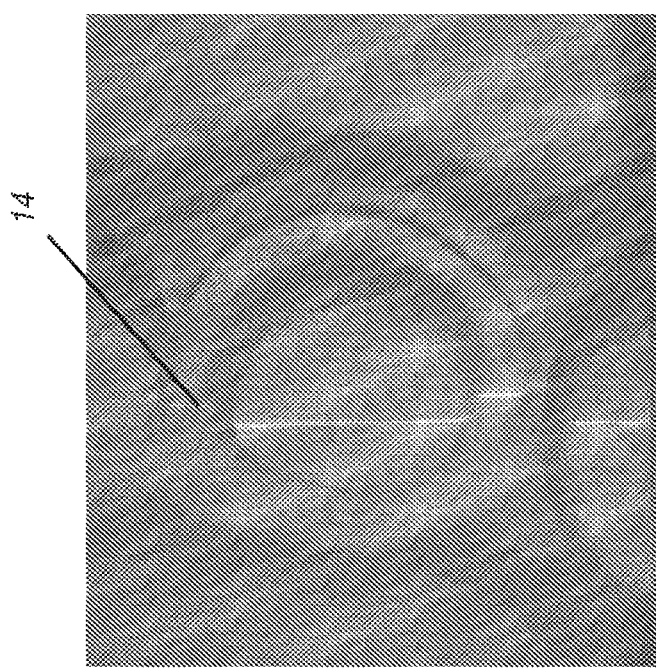
FIG. 2A shows illumination of a tooth surface with a single line of light.

FIGS. 2A and 2B show aspects of one problem with conventional approaches for using patterned light to obtain surface structure information from the human tooth. FIG. 2A shows illumination with a single line of light 14 onto the tooth, with pronounced shifting of the illumination at the tooth edges. Projection of a single line in this manner, scanned across the tooth and imaged at numerous points during the scan, can provide accurate information about portions of the surface area; however, some information is lost even with this method, such as where line segments are separated from each other. FIG. 2B shows surface imaging using a pattern with multiple lines of light. Where there are abrupt transitions along the surface, it can be difficult to positively identify the segments that correspond to each projected line and mismatches can easily occur, leading to inaccurate conclusions about surface characteristics. For example, it can be difficult to determine whether line segment 16 is from the same line of illumination as line segment 18 or adjacent line segment 24.

Exemplary method and/or apparatus embodiments can address problems of surface contour mapping using a sequence of projected images or image frames that help to better correlate pixels on the imaging sensor array with projected lines from the illumination array and to provide this correlation using a relatively small number of projected images. In order to improve the efficiency, accuracy, and/or speed of the contour imaging process, exemplary encoding method and/or apparatus embodiments can employ a combination of sparse representation and dense contour measurement techniques that provide an inherent check on detection accuracy and a highly efficient registration of the illumination device(s) and sensing device(s) to the surface.

Figure 3:
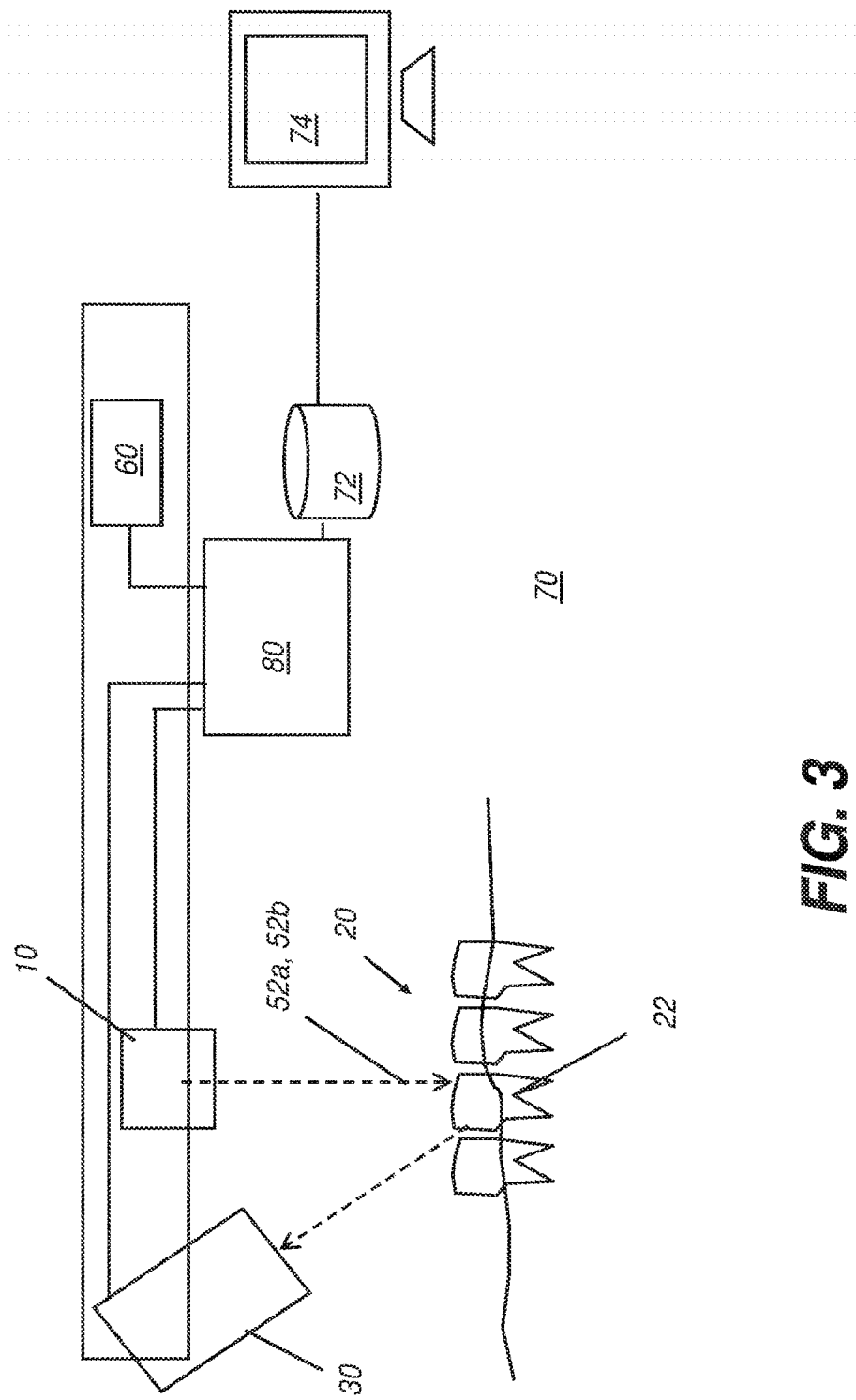
FIG. 3 is a schematic diagram showing an imaging apparatus.

The schematic diagram of FIG. 3 shows an imaging apparatus 70 for projecting and capturing both sparse images 52a and 52b that provide an encoding and register the imaging apparatus and one or more dense multiline images that map the surface contour. A control logic processor 80, or other type of computer controls the operation of illumination array 10 and imaging sensor array 30. Image data from surface 20, such as from a tooth 22, is obtained from imaging sensor array 30 and stored in a memory 72. Control logic processor 80 processes the received image data and stores the mapping in memory 72. The resulting image from memory 72 is then optionally displayed on a display 74. Memory 72 may also include a display buffer. An optional motion sensor 60, such as an accelerometer, can enable detection of motion during illumination projection.

Certain exemplary method and/or imaging apparatus embodiments for surface contour characterization address various problems of projecting and detecting a pattern of light with repeated lines or other patterned illumination features wherein the center coordinates of the repeated illumination feature are clearly identified and registered and wherein the source of each illumination feature is identified. The particular geometry of the teeth greatly complicates this task. Some projected stripes or other projected illumination features may not be perceptible at a particular camera angle or are broken into fragments that must be accounted for. Each projected stripe can have an identifying tag or label; however, the number of possible labels is limited. The position of any given projected line of light from the center of the depth range is known, along with data on how far the stripe can move at the end of its depth range. Two stripes that are farther apart than this determined or maximum distance movement are no longer unique.

Encoding Scheme

In order to provide a labeling scheme that can address and/or eliminate ambiguity in mapping or correlating a illumination feature detected by the imaging sensor array to a corresponding location on the illumination array, some exemplary embodiments of the present disclosure provide an encoding that associates a symbol or label to each line and a line-to-line encoding pattern that can be readily decoded and checked and that has sufficient pattern length so that repetition of labels does not affect illumination feature identification.

One exemplary embodiment of the present disclosure uses a binary encoding that allows representation of a pattern, such as a deBruijn sequence, known to those skilled in combinatorial mathematics. A deBruijn sequence is cyclic and uses a set of labels or elements of size or cardinality m, wherein m is an integer. A deBruijn sequence uses m labels or elements to create n>m unique positions. For the set of elements or labels {R, G, B}, an example of length 12 is as follows:

RGBRGRBRBGBG

There are four "B" labels or symbols in this sequence, but there is only one instance of a B with a G on the left and an R on the right. By combining three adjacent symbols, unique positions in the sequence are identified.

deBruijn sequences are usually designed to be cyclic, so that the uniqueness is maintained even when the sequence is repeated. For example, considering the 24 element sequence:

RGBRGRBRBGBGRGBRGRBRBGBG

The triads BGR and GRG, which occur on the boundary of the two identical deBruijn sequences, are unique. One still needs a way to distinguish the first and second occurrence of the 12-element sequence, but there is no confusion as to the boundary. The general deBruijn sequence has m symbols and a length n, with groups of g symbols or labels used to identify positions. The baseline description given herein uses values m=3, n=12, g=3.

A monochrome dental imaging system (e.g., monochrome sensor) cannot encode a deBruijn sequence using features in a single frame because there is only one detectable state of illumination available, allowing only a binary encoding. To provide the needed additional dimension, a time sequence is used to expand the encoding. By using an ordered sequence of frames, it is possible to encode a set of m=3 elements or labels, such as using as few as two successive image frames, employing a sparse frame representation. For the example sparse frame representation shown with reference to FIG. 4, the following example encoding is used, with three labels:

1, 0—R
0, 1—G
1, 1—B

With this encoding sequence, the two sparse image frames are sufficient to enable encoding for three symbols. It should be noted that additional sparse image frames can be used for encoding an expanded number of symbols or labels. For example, three sparse image frames would enable encoding the use of a set of as many as $(2^3-1)=7$ symbols, such as:

{R, G, B, C, M, Y, K}.

For the sparse encoding scheme used in a plurality of exemplary embodiments of the present disclosure, none of the elements are defined for a 0, 0 (or 0, 0, 0) encoding. For each spaced encoding position, the sequence of two or more sparse illumination frames must project at least one line of light or other illumination feature.

Figure 4:
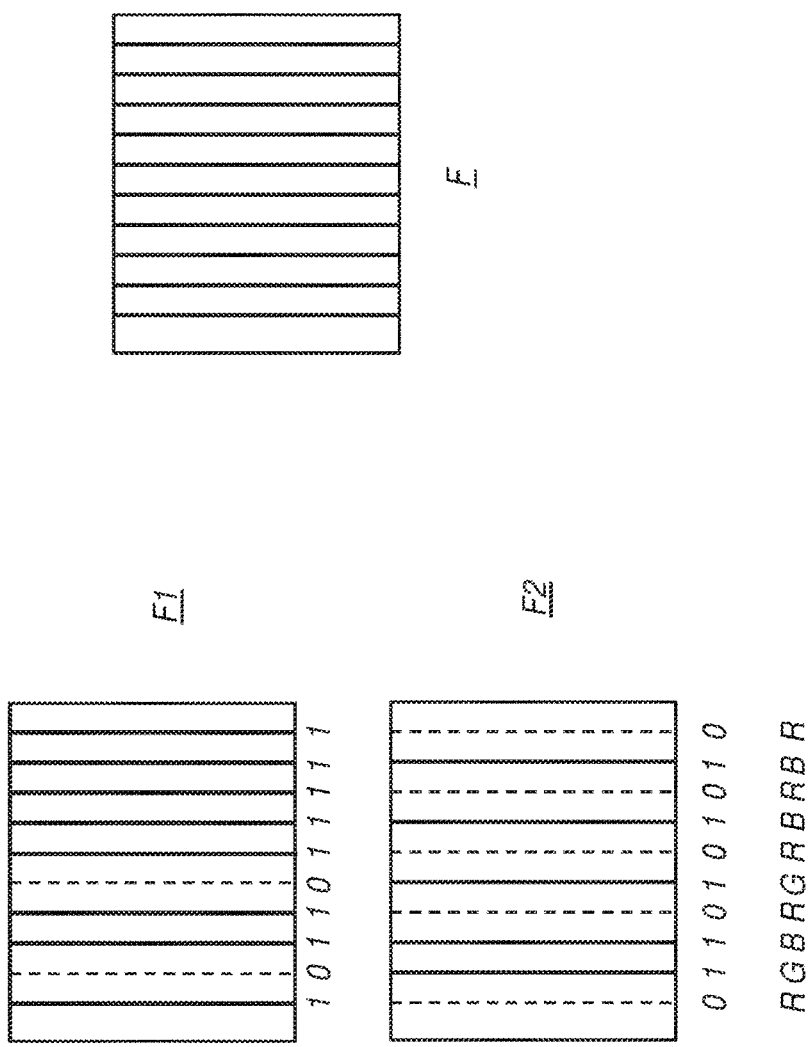
FIG. 4 is a schematic diagram that shows sparse and fully populated image frames for contour characterization.

By way of example, FIG. 4 shows a sequence of two sparse frames F1 and F2 that are projected in series to provide the example encoding RGBRGRBRBR, with the elements or labels R, G, B encoded in position as shown above. Dashed lines indicate omitted lines or illumination features that are not projected as part of the sparse frame, providing a binary "0"; unbroken lines indicate a "1". For each position, there must be a "1" in at least one of the first or second sparse frames F1 and F2. More generally stated, in a set of sparse image frames F1, F2 that are used for this encoding, each line or other illumination feature used in the encoding must appear at least once.

Frames F1 and F2 are sparse frames because they do not contain a line or feature in every available position, that is, at every unit increment, as does a fully populated multiline frame F (also termed a dense frame in the present disclosure). The spacing increment between next adjacent illumination features in each of frames F1 and F2 can vary by an integer multiple of a standard spacing unit, so that space between next adjacent lines, for example, is one, two, three, or more standard unit increments.

In FIG. 4, by way of illustration, sparse image frames F1 and F2 only show line patterns encoding a 12 element sequence. Generally, the set of line patterns are repeated a number of times horizontally across each image for complete identification of all the line groups in illumination array 10. The lines in the dense frame F are correspondingly repeated horizontally across the whole illumination array 10, with a line disposed at each unit increment position.

In terms of projected lines or other pattern elements, each of sparse frames F1 and F2 used for mapping can be considered as a proper subset of a fully populated multiline frame F. That is, each sparse frame F1 omits at least one element or illumination pattern feature of fully populated, dense frame F. Similarly, each sparse frame F2 omits at least one element of fully populated frame F. The union of sparse frames F1 and F2 includes all elements of fully populated or dense frame F.

With respect to the image surface that is sensed by the detector array, a first subset of positions on the surface receive illumination features from both first and second illumination patterns that encode a first symbol, a second subset of positions on the surface receives only illumination features from the first illumination pattern that encode a second symbol; and a third subset of positions on the surface receives only illumination features from the second illumination pattern that encode a third symbol. This type of encoding provides a useful mapping of surface locations with illumination and detector pixels, as described with reference to FIG. 1.

Figure 5:
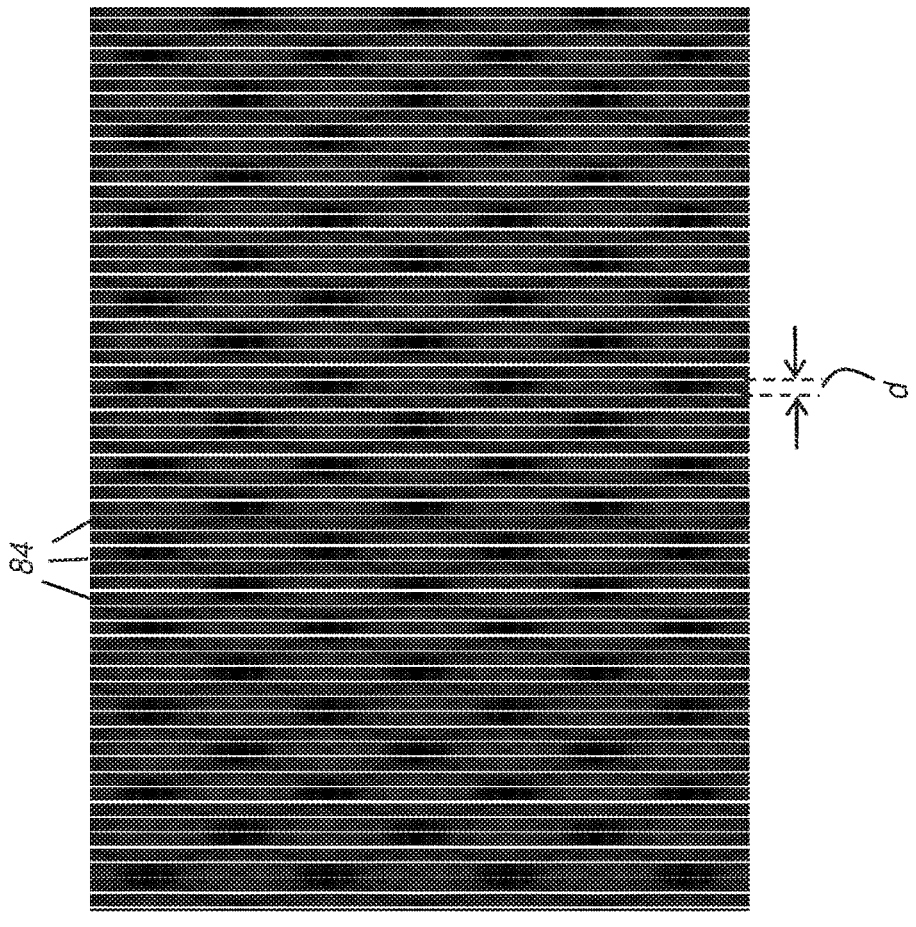
FIG. 5 is a plan view of an exemplary multiline image.

FIG. 5 is a plan view of an exemplary fully populated multiline image 54. Illumination features 84 are spaced at equal intervals, with the standard distance unit or unit increment between them shown as a distance d. Illumination features 84 are preferably 1 pixel wide, however, in one embodiment, 2 or more pixels can be used for illumination features 84 or in a sparse or dense frame. It should be noted that a pattern of lines provides one useful type of illumination feature for surface characterization, advantaged because the shift of a detected line can be readily used to determine surface featuring. However, alternate illumination features can be utilized as an illumination pattern, such as curved lines, dots, aligned shapes, or other suitable pattern.

Specifying an Encoding

While the deBruijn encoding scheme described previously can have a number of advantages for providing unique encoding that can provide an extended non-repeating sequence, other encoding sequences can be used with the sparse frame projection described with reference to FIG. 4. In an exemplary embodiment, it may be considered advantageous to have various types of repeated patterns, for example, as a check on valid reading and interpretation of sensed data.

Sequence for Surface Characterization

In certain exemplary method and/or imaging apparatus embodiments, encoding is used to help register the imaging apparatus of FIG. 3 to the surface features in the field of view. Given this precise registration, one or more subsequent fully populated frames can then be projected in order to acquire more fully detailed contour information.

Figure 6:
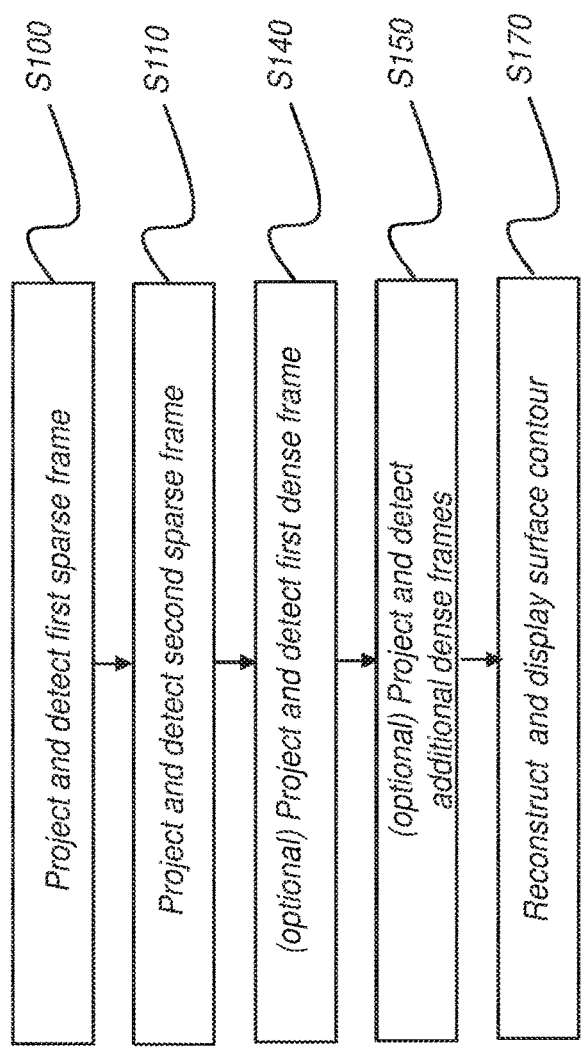
FIG. 6 is a logic flow diagram that shows a sequence for obtaining surface contour image data according to an embodiment of the present disclosure.

The logic flow diagram of FIG. 6 shows an example sequence for surface characterization that can use the sparse and fully populated frames described with reference to FIG. 4 and can be used in the intraoral imaging apparatus 70 of FIG. 3.

In first and second projection steps S100 and S110 respectively, the sparse frames F1 and F2 are projected onto the surface and detected by imaging sensor array 30 (FIG. 3). Sparse frames F1 and F2 provide a preset or the minimum number of frames needed for a mapping with unique identification of the illumination lines. If subsequent reconstruction step S170 is carried out on the data from sparse frames F1 and F2, a coarse contour of the surface can be mapped out, albeit at a relatively low resolution.

Referring again to the FIG. 6 sequence, after projection of the first and second sparse frames, a first fully populated or dense frame can be projected in an optional projection step S140. The lines in this dense frame can be shifted by a fraction of the unit increment, such as by half of the line pitch, relative to the positions of lines in the sparse frames. When this dense frame and the first and second sparse frames are processed together in a reconstruction step S170, they can then generate the surface contour at double the resolution as would be generated using only the first and second sparse frames without the dense frame.

In typical applications and depending in part on the needed resolution, additional fully populated frames can be projected toward the surface in an optional projection step S150. Where additional fully populated frames are used, the second and subsequent projected frames can be preferably positionally offset from the initial fully populated frame of step S140 and from each other to generate added surface content information. For example, a first optional populated multiline image frame F can be offset by +0.33d, with a second offset by −0.33d. In this way, significant gains in image resolution can be obtained with each additional fully populated frame F projection. In one exemplary embodiment, added surface content information can be obtained by interpolation for positions between fully populated frames or multiline frames. A reconstruction and display step S170 reconstructs and displays the computed surface contour that is generated from this processing sequence.

Figure 7B:
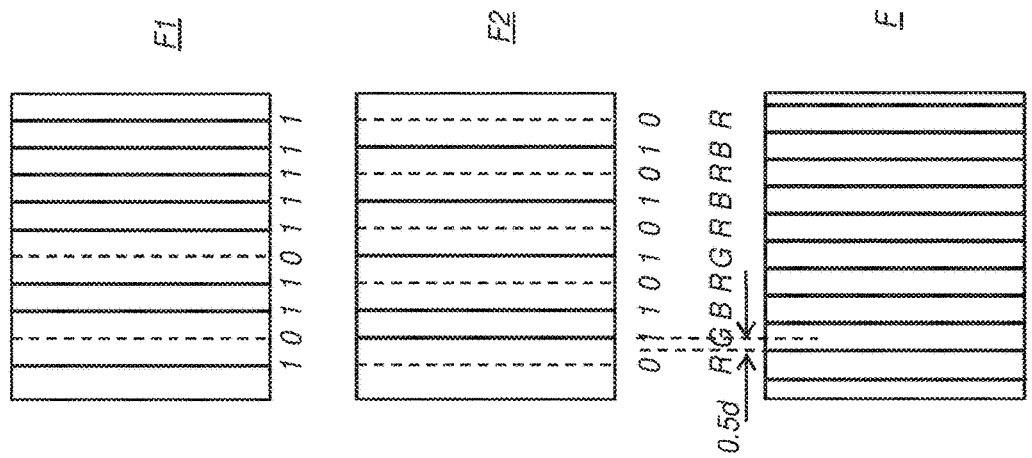
FIGS. 7A, 7B, and 7C are schematic views that show exemplary sequences of sparse and fully populated frames that can be projected onto the surface for surface characterization according to embodiments of the present disclosure.
Figure 7A:
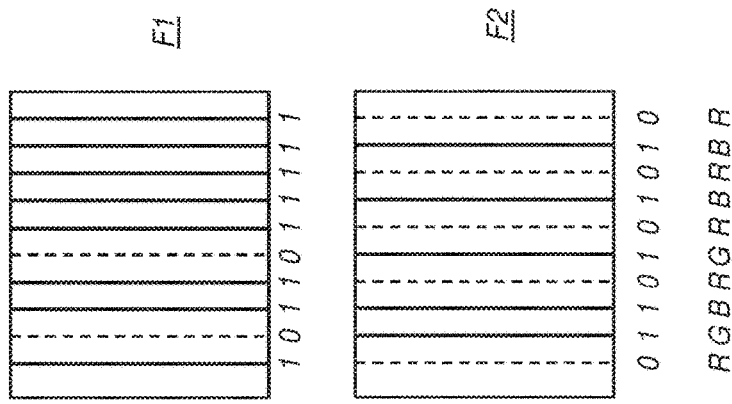
Figure 7C:
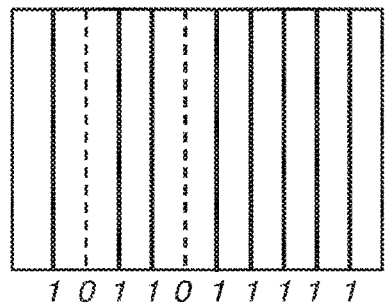
Figure 7C:
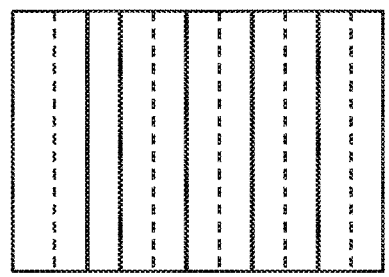
Figure 7C:
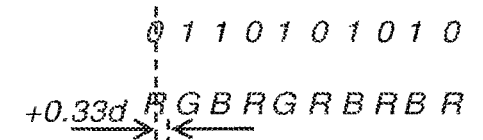
Figure 7C:
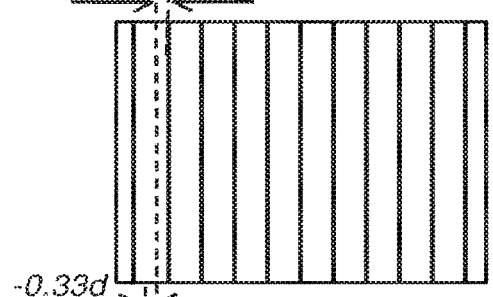
Figure 7C:
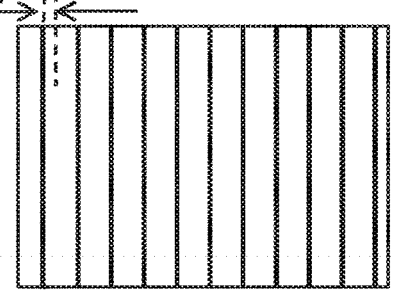

The schematic views of FIGS. 7A, 7B, and 7C show exemplary sequences of sparse and fully populated frames that can be projected onto the surface for surface characterization according to an embodiment of the present disclosure. Each sequence proceeds from the top downward in the description that follows; however, it should be noted that the sparse frames and dense or fully populated frames can be projected in any suitable order. Shown in FIG. 7A, sparse frames F1 and F2 are projected as the minimum frame sequence for surface contour mapping at sparse resolution. This sequence shows that contour characterization can be obtained using as few as two sparse frames.

FIG. 7B shows the frames sequence with the addition of a fully populated multiline frame F. In the dense frame F, the dense lines are shifted by 0.5d with respect to the line positions of sparse frames F1 and F2. Here, the three-frame sequence shown provides surface contour mapping at twice the resolution of the two frame sequence in FIG. 7A.

FIG. 7C shows an exemplary sequence with the use of two additional fully populated multiline frames F and F. The dense, multiline frames F and F' are projected with lines offset by distances +0.33d and −0.33d, respectively, from line positions of sparse frames F1 and F2. This 4-frame sequence provides surface contour mapping at 3× the resolution of the two frame sequence of FIG. 7A. Additional offset fully populated frames can also be projected, at suitable offsets (e.g., ⅕, ¼, etc. for the group of dense frames) to provide additional resolution.

It should be noted that the image frames as shown in FIGS. 7A-7C can be directed to surface 20 in any order, such as sending the fully populated multiline image frame(s) first, followed by sparse images. However, there are advantages to providing the sparse images F1 and F2 first to reduce or minimize the effects of hand motion.

In any sequence of frames F1, F2, and F that is used, there can be advantages to repeating one or more frames. Thus, for example, it can be advantageous to repeat the first frame that was projected as a final frame in the sequence. This arrangement allows the system logic to verify that camera position has not shifted relative to the patient, so that contour information can be verified for accuracy. By way of example, this method would repeat frame F1 at the end of the sequence shown in FIG. 7C, testing the positional data in order to verify that excessive shifting of position has not occurred.

By way of illustration, FIG. 8A shows schematically a portion of a single row of illumination pixels 34 from illumination array 10, energized for forming a portion of a fully populated multiline image frame F. Shaded pixels 34 in this figure are energized to provide illumination. Multiple rows of pixels are used to form the complete image; only a single row is shown in FIG. 8A. In a parallel representation, FIG. 8B shows a portion of a single row of illumination pixels 34 from illumination array 10 that is energized for forming a sparse image frame F1. In sparse image frames (e.g., F1, F2), the same preset or minimum pixel spacing is used, but some of the potential pixels are de-energized and do not deliver light to surface 20.

Light intensity for each type of image can be the same; however, there can be advantages to changing intensity for different image types. Suitable adjustment of intensity, where available, can help to reduce the impact of scattered light, for example.

The pattern arrangement shown for lines or other features in the present embodiment presents regularly spaced lines or other features. However, it should be noted that there can be advantages in providing a dense pattern that has an uneven distribution of projected features. Thus, for example, lines can be more tightly spaced over parts of the surface. Where features are not evenly distributed, with equal unit spacing, sparse frames F1 and F2 are arranged accordingly, so that spatial registration of illumination features between sparse and dense or fully populated frames is maintained. Dense or fully populated frames may omit one or more features found in the sparse frames.

Advantageously, exemplary method and/or apparatus embodiments of the present disclosure allow accurate contour characterization using as few as two, three, or four frames. This contrasts with conventional dental structured light techniques that require five or more individual frames of light patterns in order to provide accurate surface characterization of teeth from a single scanner position. Use of various exemplary embodiments of the present disclosure allow surface imaging content to be quickly acquired. At a coarser resolution, surface imaging data can be acquired using as few as two sparse frames.

Consistent with exemplary embodiments herein, a computer program can use stored instructions that perform on image data that is accessed from an electronic memory. As can be appreciated by those skilled in the image processing arts, a computer program for operating the imaging system and probe and acquiring image data in exemplary embodiments of the application can be utilized by a suitable, general-purpose computer system operating as control logic processors as described herein, such as a personal computer or workstation. However, many other types of computer systems can be used to execute the computer program of the present invention, including an arrangement of networked processors, for example. The computer program for performing exemplary method embodiments may be stored in a computer readable storage medium. This medium may include, for example; magnetic storage media such as a magnetic disk such as a hard drive or removable device or magnetic tape; optical storage media such as an optical disc, optical tape, or machine readable optical encoding; solid state electronic storage devices such as random access memory (RAM), or read only memory (ROM); or any other physical device or medium employed to store a computer program. Computer programs for performing exemplary method embodiments may also be stored on computer readable storage medium that is connected to the image processor by way of the internet or other network or communication medium. Those skilled in the art will further readily recognize that the equivalent of such a computer program product may also be constructed in hardware.

It should be noted that the term "memory", equivalent to "computer-accessible memory" in the context of the application, can refer to any type of temporary or more enduring data storage workspace used for storing and operating upon image data and accessible to a computer system, including a database, for example. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Display data, for example, is typically stored in a temporary storage buffer that is directly associated with a display device and is periodically refreshed as needed in order to provide displayed data. This temporary storage buffer is also considered to be a type of memory, as the term is used in the application. Memory is also used as the data workspace for executing and storing intermediate and final results of calculations and other processing. Computer-accessible memory can be volatile, non-volatile, or a hybrid combination of volatile and non-volatile types.

It will be understood that computer program products of the application may make use of various image manipulation algorithms and processes that are well known. It will be further understood that computer program product exemplary embodiments of the application may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product exemplary embodiments of the application, are not specifically shown or described herein and may be selected from such algorithms, systems, hardware, components and elements known in the art.

Certain exemplary dental method and/or apparatus embodiments according to the application can allow accurate dentition contour characterization using as few as two, three, or four frames of structured light. In exemplary embodiments, a sequence of symbols can be encoded in two sparse frames that are used with a dense uncoded frame, which is shifted by a pixel fraction pitch from the sparse frames. Although embodiments of the present disclosure are illustrated using dental imaging apparatus, similar principles can be applied for other types of diagnostic imaging and for other anatomy. Exemplary embodiments according to the application can include various features described herein (individually or in combination).

While the invention has been illustrated with respect to one or more implementations, alterations and/or modifications can be made to the illustrated examples without departing from the spirit and scope of the appended claims. In addition, while a particular feature of the invention can have been disclosed with respect to only one of several implementations/embodiments, such feature can be combined with one or more other features of the other implementations/embodiments as can be desired and advantageous for any given or particular function. The term "at least one of" is used to mean one or more of the listed items can be selected. The term "about" indicates that the value listed can be somewhat altered, as long as the alteration does not result in nonconformance of the process or structure to the illustrated embodiment. Finally, "exemplary" indicates the description is used as an example, rather than implying that it is an ideal. Other embodiments of the invention will be apparent to those skilled in the art from consideration of the specification and practice of the invention disclosed herein. It is intended that the specification and examples be considered as exemplary only, with a true scope and spirit of the invention being indicated by at least the following claims.

The invention claimed is:

1. A method for registering an imaging detector to a surface, the method executed at least in part on a computer and comprising:
projecting and recording, on a portion of the surface, a sequence comprising a first sparse pattern of lines followed by a second sparse pattern of lines, wherein a first subset of positions on the surface is illuminated by lines from both first and second sparse patterns corresponding to a first label, a second subset of positions on the surface is illuminated only by lines from the first sparse pattern corresponding to a second label; and a third subset of positions on the surface is illuminated only by lines from the second sparse pattern corresponding to a third label;
decoding the first, second, and third labels from the surface positions and registering each member element of the first, second, and third subsets of positions to the imaging detector according to the decoded labels; and
forming and displaying an image of the surface contour according to the recorded first and second sparse patterns.

2. The method of claim 1 further comprising verifying the decoding according to a predetermined pattern of labels and repeating the projection of at least one of the first and second sparse patterns if the verification fails.

3. The method of claim 1 wherein the labels are arranged as a deBruijn sequence.

4. The method of claim 1 further comprising detecting motion during pattern projection.

5. The method of claim 1 wherein projecting and recording is performed using a hand-held imaging apparatus.

6. The method of claim 1 further comprising storing or transmitting the surface contour image.

7. The method of claim 1 further comprising repeating the projection of either the first sparse pattern or the second sparse pattern of lines and verifying the decoding of one or more of the first, second, and third labels.

8. A method for registering an imaging detector to a surface, the method executed at least in part on a computer and comprising:
projecting, onto a first portion of the surface, a first image frame comprising a first pattern of illumination features followed by second image frame of illumination features comprising a second pattern of illumination features,
wherein a first subset of positions on the surface receives illumination features from both first and second illumination patterns that encode a first label, a second subset of positions on the surface receives only illumination features from the first illumination pattern that encode a second label, and a third subset of positions on the surface receives only illumination features from the second illumination pattern that encode a third label;
decoding the first, second, and third labels from the surface and registering each member element of the first, second, and third subsets of positions to the imaging detector according to the decoded labels; and
forming and displaying an image of the surface contour according to the registered first and second illumination patterns from the first image frame and the second image frames.

9. The method of claim 8 wherein the first image frame and the second image frame comprise spaced-apart features that are evenly spaced.

10. The method of claim 9 further comprising projecting a third image frame at a position that is offset from the first portion of the surface by less than the distance between the evenly spaced features of the first image frame.

11. The method of claim 10 further comprising verifying the decoding before projecting the third image frame.

12. The method of claim 10 further comprising re-projecting either the first or second image frame after projecting the third image frame.

13. A dental intraoral imaging apparatus, comprising:
encoding means for defining a set of three symbols and a sparse encoding of each symbol according to a two interval time sequence that represents each symbol at a location by projecting a line of light onto the same location from 1 to 2 times;
means for correlating a pixel on an illumination pixel array to a corresponding pixel on a sensor array by sequentially projecting and recording light directed from the illumination array pixel to the sensor array pixel as part of an illumination sequence that encodes a series combination of the set of symbols in two successive sparse frames of light; and
means for forming an image of the surface contour according to the recorded patterns from the two successive sparse frames of light.

14. The dental intraoral imaging apparatus of claim 13 wherein spacing between a first line of light and a second line of light that is next adjacent to the first line of light in the sparse frames is two or more times the spacing between the second line of light and a third line of light that is next adjacent to the second line.

15. The dental intraoral imaging apparatus of claim 13, wherein the two successive sparse frames of light are re-projected and re-recorded onto the same location.

16. The dental intraoral imaging apparatus of claim 13, further comprising projecting a third image frame onto the same location.

17. The method of claim 1, further comprising registering the imaging detector to the surface using the first and second sparse patterns.

18. The method of claim 1, further comprising re-projecting and re-recording the first and second sparse patterns on the surface.

19. The method of claim 1, further comprising projecting a third pattern of lines on the surface.

20. The method of claim 8, wherein the first image frame and the second image frame are used to register the imaging detector to the surface.

* * * * *